(12) United States Patent
D'Abrigeon et al.

(10) Patent No.: US 8,245,587 B2
(45) Date of Patent: Aug. 21, 2012

(54) SYSTEM FOR DEPLOYING SPATIAL APPENDICES AND SPATIAL APPENDIX COMPRISING SUCH A SYSTEM

(75) Inventors: Laurent D'Abrigeon, Theoule (FR); Yannick Baudasse, Grasse (FR)

(73) Assignee: Thales, Neuilly-sur-Seine (FR)

( * ) Notice: Subject to any disclaimer, the term of this patent is extended or adjusted under 35 U.S.C. 154(b) by 921 days.

(21) Appl. No.: 12/304,556

(22) PCT Filed: Jun. 11, 2007

(86) PCT No.: PCT/EP2007/055727
§ 371 (c)(1),
(2), (4) Date: Dec. 12, 2008

(87) PCT Pub. No.: WO2007/144329
PCT Pub. Date: Dec. 21, 2007

(65) Prior Publication Data
US 2009/0199664 A1    Aug. 13, 2009

(30) Foreign Application Priority Data
Jun. 12, 2006  (FR) ...................................... 06 52090

(51) Int. Cl.
*F16H 27/02* (2006.01)
(52) U.S. Cl. ....................................... 74/89.22; 74/86.2

(58) Field of Classification Search ............. 74/89, 89.2, 74/89.22
See application file for complete search history.

(56) References Cited

U.S. PATENT DOCUMENTS

| | | | | |
|---|---|---|---|---|
| 3,525,483 | A | * | 8/1970 | Alstyne ...................... 244/172.6 |
| 4,562,441 | A | * | 12/1985 | Beretta et al. ............... 343/781 P |
| 4,703,907 | A | | 11/1987 | Henry et al. |
| 4,771,293 | A | * | 9/1988 | Williams et al. .............. 343/757 |
| 6,008,447 | A | | 12/1999 | Meurer et al. |
| 6,124,835 | A | | 9/2000 | Nguyen et al. |
| 6,488,435 | B1 | * | 12/2002 | Janson ........................... 403/71 |
| 6,682,020 | B2 | * | 1/2004 | Janson ...................... 244/172.6 |
| 2005/0156083 | A1 | | 7/2005 | Chaix et al. |

FOREIGN PATENT DOCUMENTS

| | | |
|---|---|---|
| EP | 0 889 534 A1 | 1/1999 |
| EP | 1 547 923 A1 | 6/2005 |

* cited by examiner

*Primary Examiner* — Ha D. Ho
(74) *Attorney, Agent, or Firm* — Baker & Hostetler LLP

(57) ABSTRACT

A deployment system for spatial appendages, such as, for example, solar generators, comprises at least one two-phase deployment articulation line, furnished with two rotation spindles. The deployment system comprises a synchronization mechanism for the two rotation spindles so that when the driving spindle rotates during a first deployment phase, the driven spindle does not rotate, and then, when the driving spindle rotates during the second deployment phase, the driven spindle rotates in a manner synchronized with the driving spindle.

4 Claims, 3 Drawing Sheets

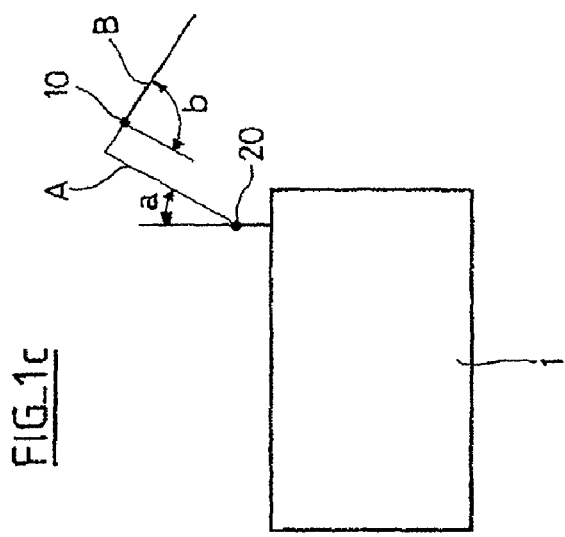
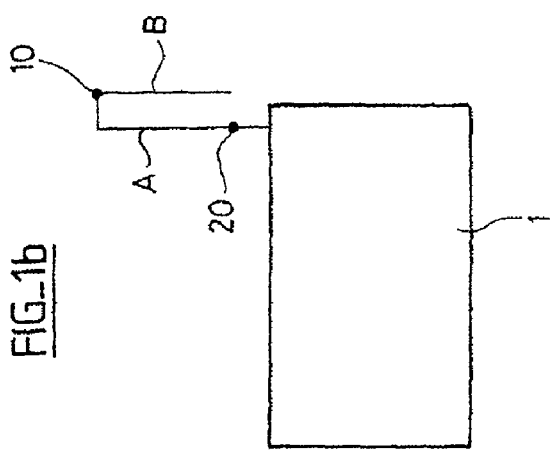
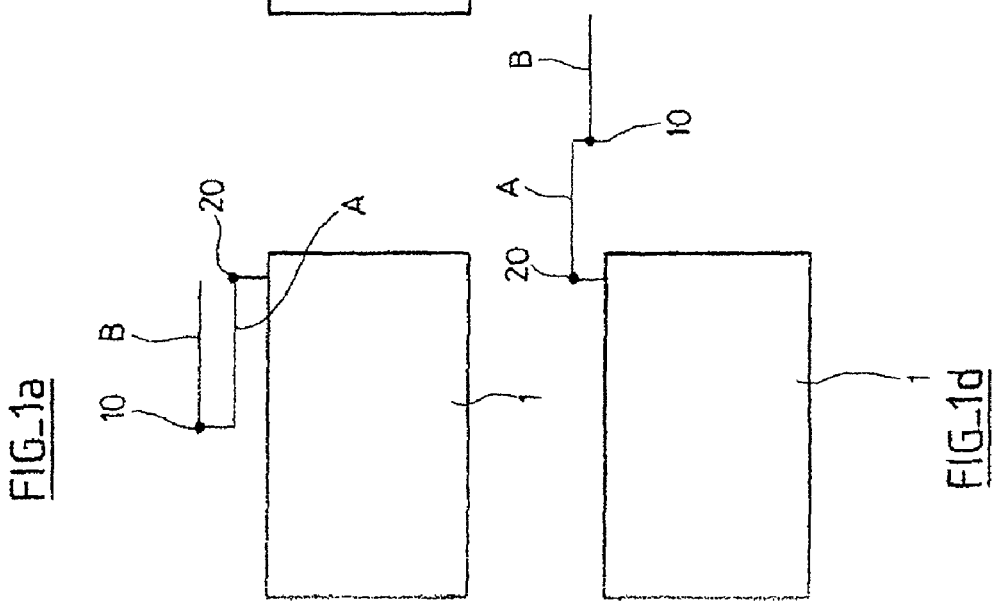

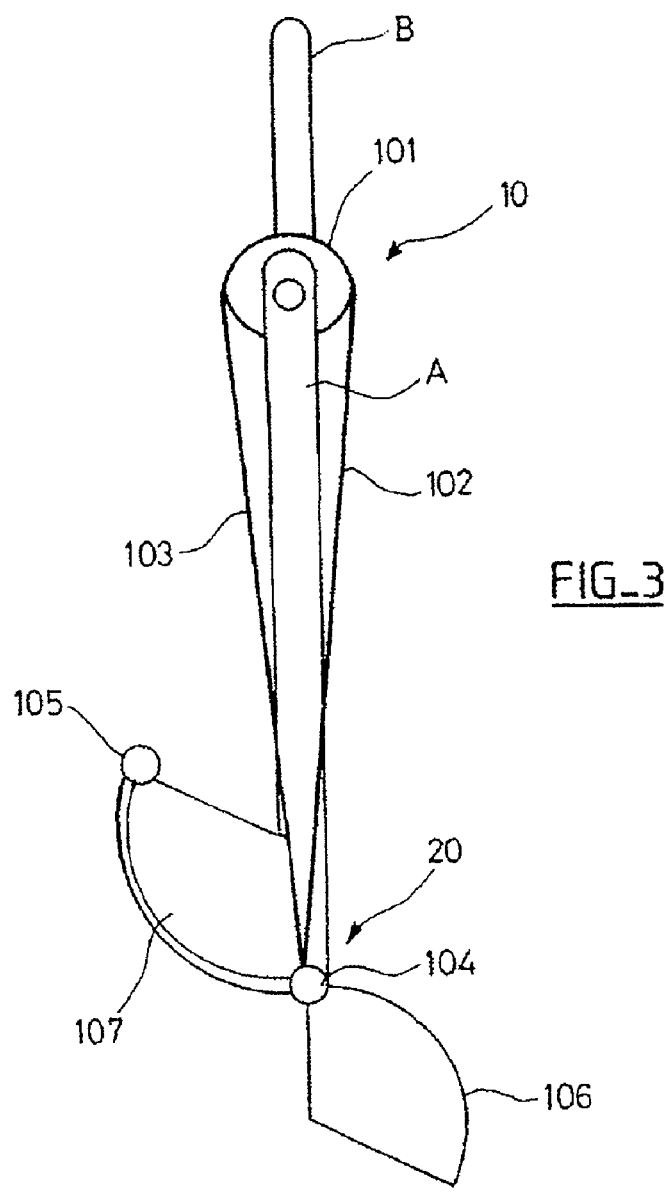
FIG_3
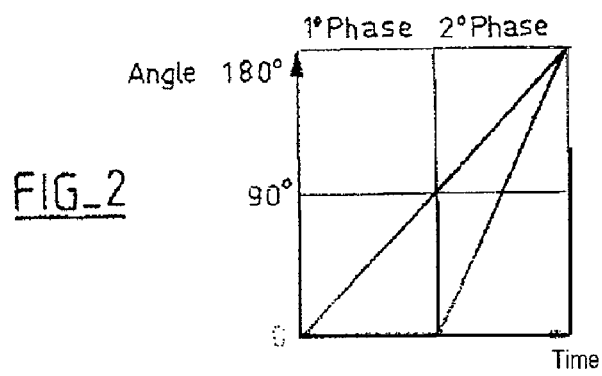
FIG_2

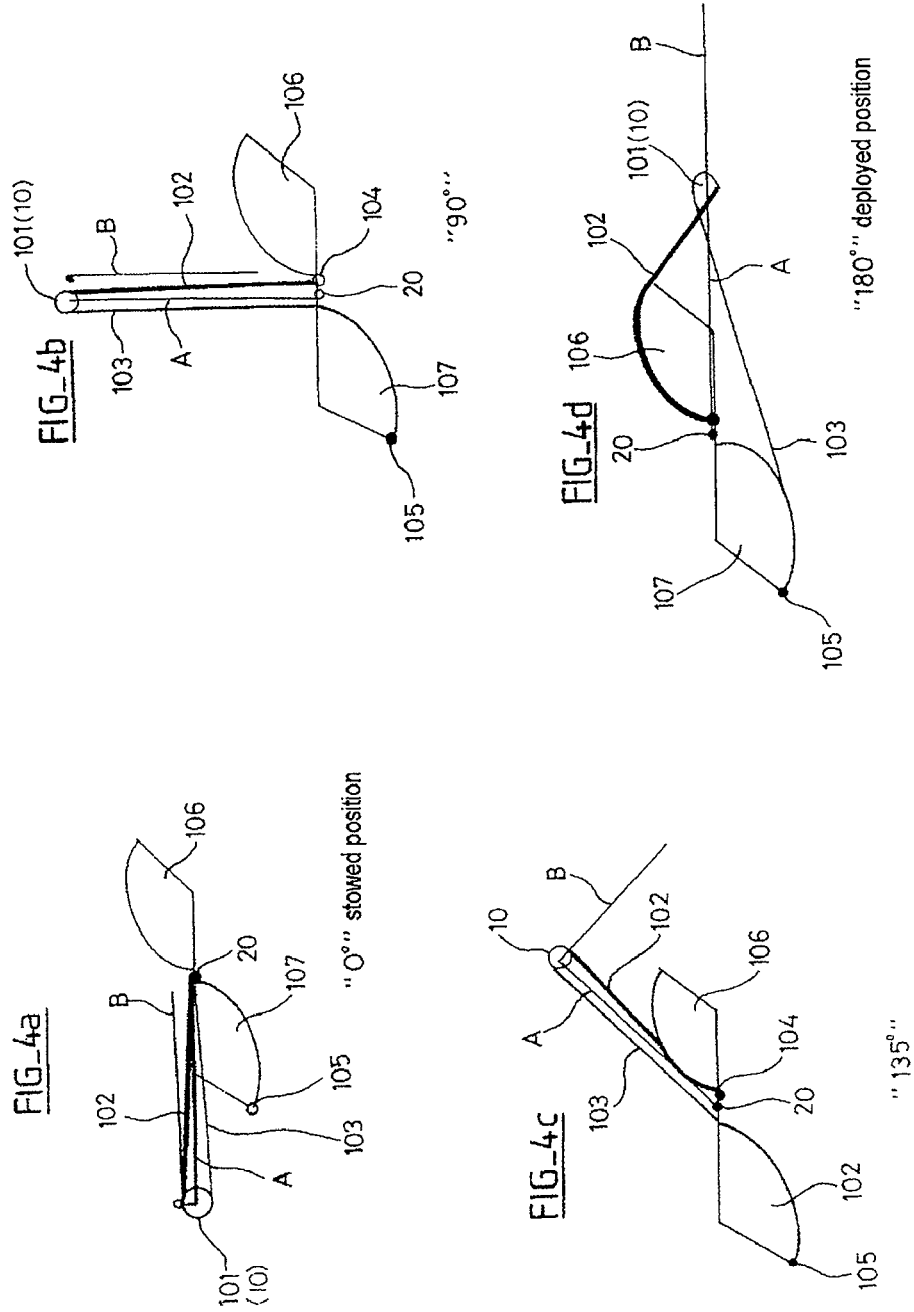

SYSTEM FOR DEPLOYING SPATIAL APPENDICES AND SPATIAL APPENDIX COMPRISING SUCH A SYSTEM

CROSS-REFERENCED TO RELATED APPLICATIONS

This is a national stage of International Application No. PCT/EP2007/055727, filed on Jun. 11, 2007, which claims priority to France Patent Application No. 0652090, filed Jun. 12, 2006, the disclosure of each application is hereby incorporated by reference in their entirety.

The invention relates to a deployment system for spatial appendages (or appendices) such as for example a mast, an antenna arm, a solar generator. It also relates to a spatial appendage comprising such a system.

The invention applies particularly to solar generators for spacecraft, notably satellites. It applies in particular to deployment systems for specific footing or for transfer articulation. Such systems are used to deploy the solar panels of satellites.

BACKGROUND OF THE INVENTION

Solar generators comprise several solar panels folded back onto the wall of the satellite during launch.

These deployment systems comprise one or more deployment articulation lines furnished with two rotation spindles.

The problem posed consists in implementing deployment kinematics according to which the driven spindle must never be disengaged from the driving spindle, the overall rotation must be driven only by the driving spindle.

Furthermore it must be possible for the system to be used for any articulation line during complex deployments in particular, for specific footings, or with transfer articulations.

Currently, solutions exist which do not address this problem area.

Specifically, solutions based on toothed-sector gears are not suitable since they leave the driven spindle disengaged over the first deployment phase and solutions based on pawls or latches are not suitable since they are not reversible.

The present invention makes it possible to solve this problem.

SUMMARY OF THE INVENTION

The subject of the invention is more particularly a deployment system for spatial appendages comprising at least one two-phase deployment articulation line, furnished with two rotation spindles, principally characterized in that it comprises a synchronization mechanism for the two rotation spindles so that, when the driving spindle rotates during a first deployment phase, the driven spindle does not rotate, and then, when the driving spindle rotates during the second deployment phase, the driven spindle rotates in a manner synchronized with the driving spindle.

Thus, the synchronization mechanism for the two rotation spindles is arranged so that when the driving spindle rotates during the first phase, from the folded-back position to an intermediate position, the driven spindle does not rotate, then during the second phase, when the driving spindle rotates from the intermediate position to a final position, the driven spindle rotates in synchronism up to this final position.

In order for the driven spindle to be retained and the mechanism to be reversible, the synchronization mechanism comprises means for retaining the driven spindle making it possible, when the driving spindle rotates from the folded-back position to the intermediate position, to hold the driven spindle and, releasing means which during a second phase, when the driving spindle rotates from the intermediate position to the final position, allows the rotation of the driven spindle in synchronism with the driving spindle so as to reach the final position.

According to an embodiment which is simple to implement, the retaining means comprise a pulley system on the driven spindle, from which there depart two cable strands attached independently of one another to the releasing means; the releasing means comprise a first winder-unwinder device, a second winder-unwinder device, these devices being eccentric, one of the cable strands comprising a point of attachment onto the first winder-unwinder device while the other strand comprises a point of attachment onto the second winder-unwinder device, the pulley system and the winder-unwinder devices being tied by the two cable strands so that one of the devices makes it possible to wind a strand from the intermediate position of the driving spindle to the final position while the other device makes it possible to unwind the other strand until the driven spindle reaches the final position.

According to an exemplary embodiment, the winder-unwinder devices each comprise a pulley sector.

The invention also relates to a solar generator comprising a deployment system according to any one of the preceding characteristics.

BRIEF DESCRIPTION OF THE DRAWINGS

Other features and advantages of the invention will be clearly apparent on reading the description given hereinafter by way of illustrative and nonlimiting example and with regard to the figures in which:

FIGS. 1a, 1b, 1c and 1d schematically illustrate the deployment kinematics implemented by the mechanism according to the invention;

FIG. 2 illustrates the diagram of the kinematics,

FIG. 3 illustrates in greater detail the synchronization mechanism according to the invention, FIGS. 4a, 4b, 4c and 4d schematically illustrate the manner of operation of the synchronization mechanism of FIG. 3 at each deployment sequence.

DETAIL DESCRIPTION

The spacecraft 1 shown diagrammatically in FIG. 1 is equipped with two deployment articulation lines each furnished with two rotation spindles, one of which is the driven spindle 10 and the other the driving spindle 20. The parts A and B coupled to the articulation spindles comprise solar panels making it possible to feed energy to the spacecraft.

Deployment takes place in accordance with the sequence illustrated by the steps numbered 1a to 1d in this figure.

Hereinafter the values of the angles of rotation are given by way of example for a better understanding of the manner of operation.

In practice, the rotation of the driving spindle up to the intermediate position is 90°, and the rotation up to the final position is 180°.

In the phase of the folded back (also termed stowed) position, the parts coupled to the deployment articulations on the driving spindle and on the driven spindle lie in the position illustrated by step 1a. In the deployment phase, the parts A open, passing from a 0 position to 90°, and the parts B are still folded back on the parts A, as illustrated in step 1b. In step 1c, the parts A continue to deploy and the parts B begin deployment. The parts A and B continue to deploy so as to lie in the final position of step 1*d*, after an opening, from 90° to 180°, for the parts A and 0° to 180° for the parts B.

The deployment kinematics demand that during deployment phase 1*a* corresponding to steps 1*a* and 1*b* of the diagram, the system passes from the so-called "stowed" position to the 90° position, the two parts have no motion with respect to one another and the driven spindle 11 is retained so as to avoid any disturbing relative motion.

During deployment phase 1*b* corresponding to steps 1*c* and 1*d* of the diagram, the system passes from the 90° position to the deployed position, the relative angle of opening between the two movable parts is synchronized with the angle of opening of the first movable part.

FIG. 2 illustrates the diagram of the deployment kinematics. The angle b is in general equal to 2*a*.

During deployment and in accordance with the required deployment kinematics, the driven spindle 10 is never disengaged from the driving spindle 20. The overall rotation is driven only by the driving spindle.

FIG. 3 illustrates the synchronization mechanism putting according to the invention making it possible to implement this kinematics.

This mechanism comprises a pulley system 101 on the driven spindle 10 from which there depart two cable strands 102, 103 arriving at eccentric pulley sectors 104, 105. The two strands 102, 103 make it possible to retain the driven spindle 10 in both directions of rotation. The profile of the pulley sectors is not strictly circular but exhibits a flatter curvature than that of a circle so as to obtain a linear translation of the cables.

The cable strand 102 is fixed to the pulley sector 106 by a point of attachment 104. The cable strand 103 is fixed to the pulley sector 107 by a point of attachment 105.

The sequence illustrated in steps 4*a* to 4*d* of FIG. 4 corresponds to the kinematics illustrated in FIG. 1.

The pulley sector 106 makes it possible to wind the cable strand 102 on the basis of the rotation of the driving spindle from 90° to 180°: steps 4*c* and 4*d*.

The pulley sector 107 makes it possible to unwind the other cable strand, that is to say the strand 103, on the basis of the rotation of the driving spindle from 90° to 180°: steps 4*c* and 4*d*.

The driven spindle is retained in both directions of rotation whatever the configuration during the first deployment phase. The solution is reversible and allows a shock-free transition to 90° even if the rotation of the driving spindle is not strictly increasing (the case of oscillations about a mean angle of rotation).

The cable strands can of course be replaced in an equivalent manner with flexible bands or belts.

In a variant embodiment, the unwinder pulley sector, that is to say the sector 107, can be replaced with a linkage whose rotation spindle is off-centered and which begins to pivot as soon as the driving spindle has rotated by 90°, step 4*b*. This execution variant makes it possible to avoid the elbow presented by the cable strand 103 on the winder pulley sector 107 in step 4*a* (position 0°).

The invention claimed is:

1. A deployment system for spatial appendages comprising at least one two-phase deployment articulation line, furnished with two rotation spindles (10, 20), comprising a synchronization mechanism (101, 102, 103, 106, 107), for the two rotation spindles so that when the driving spindle (20) rotates during a first deployment phase, the driven spindle (10) does not rotate, and then, when the driving spindle rotates during the second deployment phase, the driven spindle rotates in a manner synchronized with the driving spindle, wherein:

the synchronization mechanism comprises retaining means (101, 102, 103) making it possible during the first phase, when the driving spindle rotates from a folded-back position to an intermediate position, to hold the driven spindle and, releasing means (106, 107) which during the second phase, when the driving spindle rotates from the intermediate position to a final position, to allow the rotation of the driven spindle in synchronism with the driving spindle so as to reach the final position;

said retaining means comprising a pulley system (101) on the driven spindle (10), from which there depart two cable strands (102, 103) attached independently of one another to the releasing means; the releasing means comprising a first winder-unwinder device (106), a second winder-unwinder device (107), these devices being eccentric, one of the cable strands comprising a point of attachment (104) onto the first winder-unwinder device while the other strand comprises a point of attachment (105) onto the second winder-unwinder device, the pulley system and the winder-unwinder devices being tied by the two cable strands so that one of the devices makes it possible to wind a cable strand from the intermediate position of the driving spindle to the final position while the other device makes it possible to unwind the other cable strand until the driven spindle reaches the final position.

2. The deployment system as claimed in claim 1, wherein the winder-unwinder devices each comprise a pulley sector (106, 107).

3. The deployment system as claimed in claim 1, wherein the rotation of the driving spindle up to the intermediate position is 90°, and the rotation up to the final position is 180°.

4. A solar generator comprising a deployment system as claimed in claim 1.

\* \* \* \* \*